United States Patent
Badding et al.

(10) Patent No.: US 7,531,261 B2
(45) Date of Patent: May 12, 2009

(54) TEXTURED ELECTROLYTE SHEET FOR SOLID OXIDE FUEL CELL

(75) Inventors: Michael E Badding, Elmira, NY (US); Jacqueline L Brown, Lindley, NY (US); Sean M Garner, Elmira, NY (US); Thomas D Ketcham, Big Flats, NY (US); Dell J St Julien, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/611,507

(22) Filed: Jun. 30, 2003

(65) Prior Publication Data

US 2004/0265663 A1 Dec. 30, 2004

(51) Int. Cl.
*H01M 8/10* (2006.01)
*H01M 8/12* (2006.01)

(52) U.S. Cl. ............................. 429/30; 429/33; 429/46
(58) Field of Classification Search .................. 429/30, 429/33, 128, 38, 40, 44
See application file for complete search history.

(56) References Cited

U.S. PATENT DOCUMENTS

| | | | |
|---|---|---|---|
| 4,135,040 A | 1/1979 | Thornton ..................... 429/191 |
| 4,272,353 A * | 6/1981 | Lawrance et al. ............ 204/283 |
| 4,329,271 A | 5/1982 | Kemr et al. | |
| 4,353,958 A | 10/1982 | Kita et al. | |
| 4,396,480 A | 8/1983 | Hegedus et al. | |
| 5,085,455 A | 2/1992 | Bogner et al. ................ 280/618 |
| 5,089,455 A | 2/1992 | Ketcham et al. ............ 501/104 |
| 5,273,837 A | 12/1993 | Aitken et al. ................... 429/30 |
| 5,290,323 A | 3/1994 | Okuyama et al. | |
| 5,306,646 A | 4/1994 | Lauf | |
| 5,314,508 A | 5/1994 | Taniguchi et al. | |
| 5,326,519 A | 7/1994 | Claussen | |
| 5,518,829 A | 5/1996 | Satake et al. | |
| 5,519,191 A | 5/1996 | Ketcham et al. ............ 219/552 |
| 5,531,019 A * | 7/1996 | Taira et al. ................. 29/623.5 |
| 6,045,935 A | 4/2000 | Ketcham et al. .............. 429/30 |
| 6,287,722 B1 | 9/2001 | Barton et al. | |
| 6,361,893 B1 | 3/2002 | George et al. | |
| 6,428,920 B1 | 8/2002 | Badding et al. ............... 429/30 |
| 2001/0044041 A1* | 11/2001 | Badding et al. ............... 429/32 |
| 2001/0044043 A1* | 11/2001 | Badding et al. ............... 429/40 |
| 2002/0012825 A1* | 1/2002 | Sasahara et al. .............. 429/30 |

(Continued)

FOREIGN PATENT DOCUMENTS

EP 0 472 789 A1 8/1990

(Continued)

OTHER PUBLICATIONS

Minh, N.Q., "Ceramic Fuel Cells", Journal of the American Ceramic Society., vol. 76, No. 3, pp. 563-588 (1993).

(Continued)

*Primary Examiner*—Keith Walker
(74) *Attorney, Agent, or Firm*—Svetlana Z. Short

(57) ABSTRACT

An electrolyte sheet comprises a body of a varied thickness. The electrolyte sheet has at least one non-porous surface. This non-porous surface is a textured surface with multiple indentations therein. The thickest part of the electrolyte sheet is at least 0.5 micrometers greater than the thinnest part of the sheet.

10 Claims, 9 Drawing Sheets

U.S. PATENT DOCUMENTS

| | | | |
|---|---|---|---|
| 2002/0102450 A1* | 8/2002 | Badding et al. ............... | 429/32 |
| 2002/0127344 A1 | 9/2002 | Pham et al. | |
| 2002/0174935 A1 | 11/2002 | Burdon et al. | |
| 2002/0174936 A1 | 11/2002 | Burdon et al. | |
| 2002/0174937 A1 | 11/2002 | Burdon et al. | |
| 2003/0013046 A1 | 1/2003 | Fonash et al. | |
| 2003/0096147 A1 | 5/2003 | Badding et al. ............... | 429/30 |
| 2003/0165732 A1 | 9/2003 | McElroy ...................... | 429/44 |
| 2003/0180602 A1* | 9/2003 | Finn et al. .................... | 429/38 |

FOREIGN PATENT DOCUMENTS

| | | |
|---|---|---|
| EP | 0 603 620 A1 | 6/1993 |
| EP | 0 524 013 B1 | 3/1997 |
| EP | 1 113 518 | 7/2001 |
| EP | 1113518 A1 * | 7/2001 |
| WO | WO 01/48855 | 7/2001 |
| WO | WO 01/89010 A1 | 11/2001 |
| WO | WO 01/89017 A1 | 11/2001 |
| WO | WO 01/89018 A1 | 11/2001 |
| WO | WO 02/43937 A2 | 6/2002 |

OTHER PUBLICATIONS

Blum et al, "Multi-kW-SOFC Development at Siemens", Solid Oxide Fuel Cells IV, pp. 163-172, 1995.

Piron et. al., "Ferritic Steel Interconnect for Reduced Temperature SOFC", Solid Oxide Fuel Cells VII, pp. 811-819, 2001.

Metals Handbook, The American Society for Metals, 1948 Edition, pp. 553-556.

Miyake et al, "Development of a Planar Solid Oxide Fuel Cell Module at Sanyo", Solid Oxide Fuel Cells (1995), p. 100-109.

Norton, Robert L., "Designing to Avoid Stress Concentrations", Machine Design, An Integrated Approach, Section 2, p. 235, 1998.

Timoshenko et al., "Elements of Strength of Materials", p. 29, 1940.

J. Den Hartog, "Advanced Strength of Materials", p. 48, 1952.

Yasuda et al, Fuel Cells—Powering the 21st Century, Fuel cell seminar, Oct. 2000, Portland, OR, Courtesy Associates (Washington, DC), p. 574.

* cited by examiner

TEXTURED ELECTROLYTE SHEET FOR SOLID OXIDE FUEL CELL

BACKGROUND OF THE INVENTION

1. Field of the Invention

The present invention relates generally to inorganic electrolyte sheets suitable for use in fuel cells and, more particularly to textured electrolyte sheets suitable for use in solid oxide fuel sells.

2. Technical Background

U.S. Pat. No. 4,135,040 describes the use of textured electrolyte to increase ion-conductive surface area. The patent specifies that this electrolyte is suitable for use in sodium-sulfur, sodium-halogen, lithium anode type cells and solid state cells. These types of galvanic "battery" cells utilize solid state electrolytes which conduct positive ions, such as sodium or lithium, which are very mobile at low temperatures. Such electrolytes are typically fairly thick (over 200 micrometers), to maintain good mechanical integrity. This patent does not disclose solid oxide fuel cells, does not describe the thickness of the electrolyte, nor the dimensions of the features on the textured surfaces.

The use of electrolyte materials for solid oxide fuel cells has been the subject of considerable amount of research in recent years. The typical components of a solid oxide fuel cell comprise a negatively-charged oxygen-ion conducting electrolyte sandwiched between two electrodes. Electrical current is generated in such cells by oxidation, at the anode, of a fuel material, for example hydrogen, which reacts with oxygen ions conducted through the electrolyte. Oxygen ions are formed by reduction of molecular oxygen at the cathode.

U.S. Pat. No. 5,085,455 discloses thin, smooth inorganic sintered sheets. The disclosed sintered sheets have strength and flexibility to permit bending without breaking as well as excellent stability over a wide range of temperatures. Some of the disclosed compositions, such as yttria stabilized zirconia YSZ ($Y_2O_3$—$ZrO_2$) would be useful as electrolytes for fuel cells. It is known that at sufficient temperatures (e.g., about 725° C. and above), zirconia electrolytes exhibit good ionic conductance and very low electronic conductance. U.S. Pat. No. 5,273,837 describes the use of such compositions to form thermal shock resistant solid oxide fuel cells.

U.S. patent Publication US2002/0102450 describes solid electrolyte fuel cells which include an improved electrode-electrolyte structure. This structure comprises a solid electrolyte sheet incorporating a plurality of positive and negative electrodes, bonded to opposite sides of a thin flexible inorganic electrolyte sheet. One example illustrates that the electrodes do not form continuous layers on electrolyte sheets, but instead define multiple discrete regions or bands. These regions are electronically connected, by means of electrical conductors in contact therewith that extend through vias in electrolyte sheet. The vias are filled with electronically conductive materials.

U.S. patent Publication US2001/0044043 describes solid electrolyte fuel cells utilizing substantially planar, smooth electrolyte sheet with a roughened interface surface layer. This publication discloses electrolyte sheet thickness below 45 micrometers. The ceramic electrolyte sheet is flexible at such thicknesses.

U.S. Pat. No. 6,428,920 describes a porous nanocrystaline interface roughened layer placed on top of and sintered to the smooth electrolyte sheet (substrate). The porous nanocrystaline roughening layer has a randomly structured surface with submicron surface features (grain size below 1 micron and preferably below 0.5 micrometers) and characterized by the arithmetic average surface roughness of about 0.2 micrometers.

Electrical conductance of the electrolyte is proportional to its material conductance times its thickness. That is, the electrolyte's ohmic resistance depends on material properties of the electrolyte and is proportional to the thickness of the electrolyte. Thus, in order to reduce ohmic resistance and to improve electrical conductance, electrolyte thickness must be as thin as possible. However, reduction in electrolyte thickness results in physical weakening of the electrolyte. For example, a ceramic electrolyte sheet having a thickness below 10 micrometers often breaks during handling or processing making process yields relatively low. In addition, a defect in an electrolyte sheet may necessitate a replacement of entire electrolyte structure.

SUMMARY OF THE INVENTION

One advantage of the electrolyte sheet of the present invention is that it provides increased conductance while maintaining structural strength and improving ohmic resistance, stress handling capability, electrode adhesion and uniform flexing capability.

According to one aspect of the present invention the electrolyte sheet comprises substantially non-porous body of varied thickness. This non-porous body has a textured surface with multiple indentations therein. The thickest part of the electrolyte sheet is at least 0.5 micrometers greater than the thinnest part of the electrolyte sheet.

According to one embodiment of the present invention the thickest part of the electrolyte sheet is at least 2 micrometers greater than the thinnest part of the electrolyte sheet. According to this embodiment the electrolyte sheet has an average thickness greater than 5 micrometers and less than 100 micrometers. It is preferable that the average thickness be below 45 micrometers and most preferable that the average thickness is below 20 micrometers.

According to one embodiment of the present invention a solid oxide electrode/electrolyte assembly comprises:

(i) a thin electrolyte sheet of varied thickness with an average thickness between 3 micrometers and 30 micrometers and a thickness variation of at least 2 micrometers;

(ii) at least one cathode disposed on a first surface of the electrolyte sheet; and (iii) at least one anode disposed opposite the cathode on a second surface of the electrolyte sheet.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
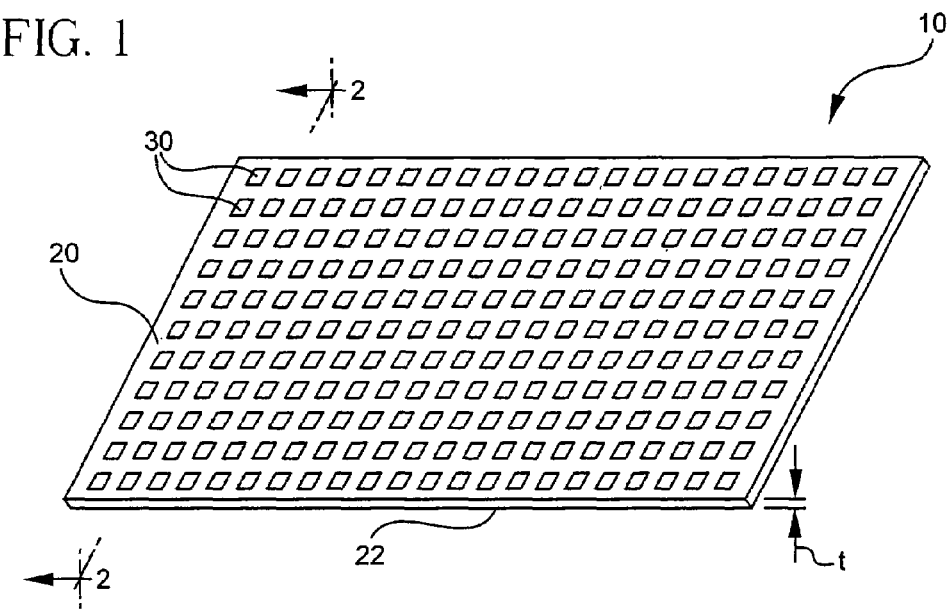
FIG. 1 is a schematic illustration of an exemplary electrolyte sheet of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts. One exemplary embodiment of the inorganic electrolyte sheet of the present invention is shown in FIG. 1, and is designated generally throughout by the reference numeral 10. The electrolyte sheet 10 is a thin ceramic sheet, with two opposite major surfaces 20, 22 and an average thickness t. At least one of these surfaces, for example surface 20, is textured. The surface 20 of the electrolyte sheet 10 of FIG. 1 includes multiple indentations 30. It is preferable that the indentations 30 be periodically arranged on the surface of the electrolyte sheet. However, the indentations may also be in a non-periodic arrangement.

Figure 2:
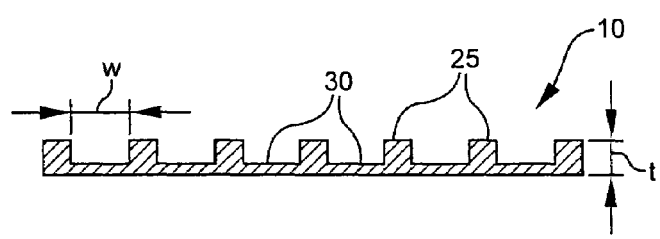
FIG. 2 illustrates a cross sectional view of the electrolyte sheet of FIG. 1.
Figure 3:
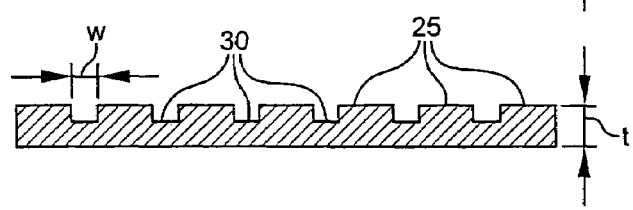
FIG. 3 illustrates schematically alternative spacings of the indentations of the electrolyte sheet of FIG. 1.
Figure 4A:
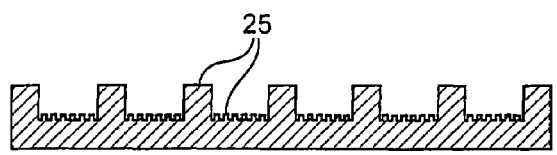
FIGS. 4A and 4B illustrate schematically that the indentations on the surface of the electrolyte sheet may also be textured.
Figure 4B:
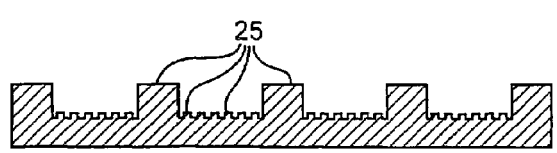

A cross-section of a portion of the electrolyte sheet 10 is illustrated schematically in FIG. 2. The indentations 30 may be wider than they are deep and may be spaced apart by distances greater than their width W (or greatest dimension). Alternatively, the indentations 30 may be spaced apart by distances equal to or smaller than their widths. This is shown schematically, for example, in FIG. 3. The indentations may also be micro-textured as shown in FIGS. 4A and 4B. For example, indentations 30 may have an average depth and width of 5 micrometers. These indentations 30 may include grooves or other structure (for example, 0.5 micrometers deep) on their bottom surfaces.

The indentations 30 reduce the average thickness t of the electrolyte sheet 10, therefore reducing its ohmic resistance and increasing its ionic conductance, without significantly reducing the mechanical properties of the electrolyte sheet. This decrease in ohmic resistance and the increase in ionic conductance advantageously enables the electrolyte sheet 10 to operate at relatively low temperatures (i.e., below 725° C.). Thus, one may choose to utilize the electrolyte sheet of the present invention in the temperature ranges of 600° C. to 725° C., as well as in the conventional temperature ranges of 725° C. to 850° C.

It is preferred that the electrolyte sheet be thin enough so that the electrolyte's ohmic resistance be less than about 0.5 ohm-cm$^2$ and more preferably less than 0.2 ohm-cm$^2$. In addition, the indentations or surface texturing also advantageously increases surface area of the electrolyte sheet, thus increasing ionic conductance. Thus, in order to decrease ohmic resistance and to increase ionic conductance of the electrolyte sheet 10 both sides 20, 22 may be textured.

The electrolyte sheet 10 is has a substantially non-porous (i.e., substantially without closed pores, porosity being less than 5%) body and the thickest part the electrolyte sheet 10 is at least 0.5 micrometers greater than the thinnest part of the electrolyte sheet. It is preferable that porosity is less than 3% and more preferable that porosity is less than 1%. It is also preferable that the difference Δt between the thinnest and the thickest part of the electrolyte sheet 10 be between 0.5 micrometers and 90% of the average thickness t. It is preferable that this difference Δt be between 1 micrometer 40 micrometers, and more preferable that it be between 1 micrometer and 20 micrometers. It is even more preferable that this thickness difference Δt be between 2 micrometers 15 micrometers. It is most preferable that this thickness difference be 3 to 10 micrometers. The electrolyte sheet 10 preferably has an average thickness t that is greater than 4 micrometers and less than 100 micrometers, preferably less than 45 micrometers, more preferably between 4 micrometers and 30 micrometers, and most preferably between 5 micrometers and 18 micrometers. Lower average thickness is also possible. The lower limit of thickness is simply the minimum thickness required to render the structure amenable to handling without breakage. It is preferable that the thin areas of the electrolyte sheet be less than 20 micrometers thin, preferably less than 15 micrometers thin and more preferably less than 10 micrometers thin. It is preferable that the electrolyte sheet body is a monolithic body (i.e., a body produced as one piece instead of multiple layers of different porosity that have been sintered together).

The thin, textured electrolyte sheets such as those described above can be advantageously utilized in the manufacture of solid oxide fuel cells. Thus, according to one embodiment of the present invention a solid oxide electrode/electrolyte assembly 50 of a fuel cell comprises: (a) a thin ceramic electrolyte sheet 10 of varied thickness, with an average thickness between 3 micrometers and 30 micrometers; (b) at least one cathode 52 disposed on a first surface 20 of the electrolyte sheet 10; and (c) at least one anode 54 disposed opposite the cathode 52, on a second surface 22 of the electrolyte sheet 10; wherein the electrolyte sheet 10 has a thickness variation of at least 2 micrometers. Such an assembly is illustrated in FIGS. 5A and 5B.

Figure 5A:
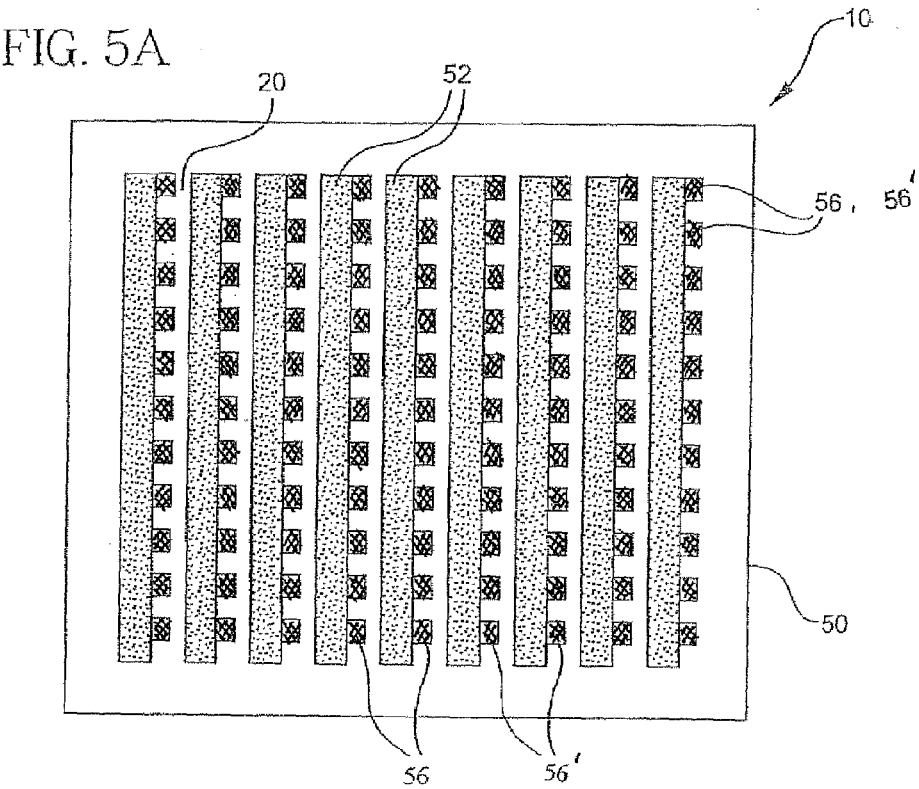
FIGS. 5A and 5B illustrate an electrode-electrolyte assembly with eight cells connected in series through the interconnect vias.
Figure 5B:
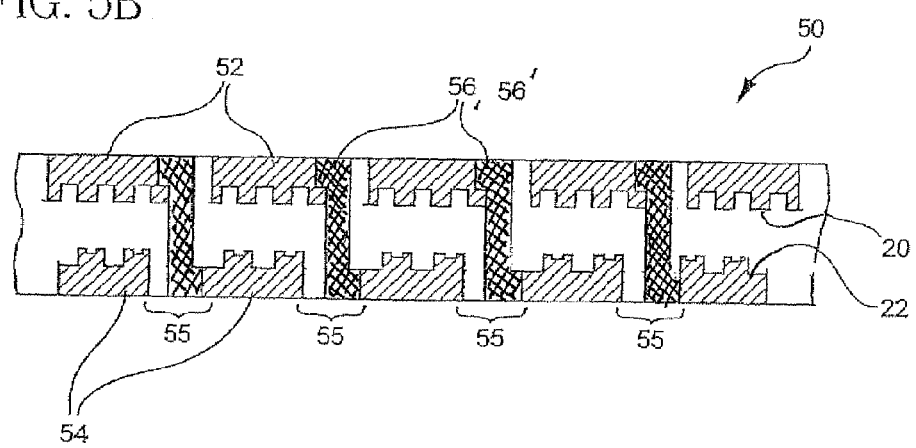

More particularly, FIGS. 5A and 5B show two views of self supporting zirconia-3 mole % yttria electrolyte sheet 10 supporting electrodes 52, 54 in the form of rectangular segments connected through small vias (holes) 56 in the electrolyte sheet 10. The top plane of the electrode-electrolyte assembly is shown in FIG. 5A. FIG. 5B is a schematic elevational cross sectional view of a five-cell section of the electrode-electrolyte assembly shown in FIG. 5A. According to this embodiment the electrode/electrolyte assembly 50 includes a plurality of cathode-anode pairs 52, 54. The cathode-anode pairs 52, 54 are separated from one another by via galleries 55. The via galleries 55 include a plurality of interconnects (called "via interconnects") 56' situated in the vias (via holes) 56. These interconnects 56) conduct electronic current from the anode of one cell to the cathode of an adjacent cell. It is preferable that the body of the electrolyte sheet 10 which is located under the electrodes (anode(s) and cathode(s)) is relatively thin. That is, it is preferable that 50% and more preferably 75% of the area under the electrodes be thinned. This design is notable for the absence of expensive interconnect plates.

Thin electrolyte sheets can be formed in the green state in a molded configuration and subsequently sintered to form an electrolyte sheet with a large measure of flexibility. Preparation of green (unfired) material is known in the art and is described, for example in U.S. Pat. No. 4,710,227. More specifically, this patent discloses the preparation of thin flexible "green" (unfired) tapes from solutions, the tapes being coated and cut, stacked and fired to form thin-dielectric capacitors. This type of process is further described in published European applications EP 0302972 and EP 0317676. Thus, in order to manufacture a thin, textured, electrolyte of the present invention a thin textured sheet or layer comprising the green pre-ceramic material, is first produced. The green pre-ceramic material is then sintered to provide a textured, sintered ceramic sheet with a flexibility sufficient to permit a high degree of bending without breakage under an applied force. Flexibility in the sintered ceramic sheets is sufficient to permit bending to an effective radius of curvature of less than 20 centimeters or some equivalent measure, preferably less than 5 centimeters or some equivalent measure, more preferably less than 1 centimeter or some equivalent measure.

By an "effective" radius of curvature is meant that radius of curvature which may be locally generated by bending in a sintered body in addition to any natural or inherent curvature provided in the sintered configuration of the material. Thus, the resultant curved sintered ceramic electrolyte sheets can be further bent, straightened, or bent to reverse curvature without breakage.

The flexibility of the electrolyte sheet will depend, to a large measure, on layer thickness and, therefore, can be tailored as such for a specific use. Generally, the thicker the electrolyte sheet the less flexible it becomes. Thin electrolyte sheets are flexible to the point where toughened and hardened sintered ceramic electrolyte sheet may bend without breaking to the bent radius of less than 10 mm. Such flexibility is advantageous when the electrolyte sheet is used in conjunctions with electrodes and/or frames that have dis-similar coefficients of thermal expansion and/or thermal masses.

The texturing of one or both surfaces 20, 22 can be accomplished in various manners prior to sintering of the electrolyte sheet. For example, textured electrolyte sheets can be produced by providing a green sheet of solid, negative ion-conducting (e.g., $O_2^-$) pre-ceramic material (for example, zirconia-3 mole % yttria, referred to herein as 3 YSZ), texturing at least one face of this sheet and then sintering the green sheet to provide a solid ion conductive electrolyte sheet with thickness variations from 0.5 micrometers to 40 micrometers. It is preferable that the sintering is done at temperatures above 1000° C., more preferably above 1300° C., for about 1-3 hours. For example, a method of making a textured electrolyte sheet includes the steps of: (a) providing a green pre-ceramic sheet; (b) texturing the green pre-ceramic sheet such that it has varied thickness to provide at least 0.5 micrometer variations in its thickness; (c) sintering the textured, green pre-ceramic sheet to provide an electrolyte sheet with a substantially non-porous body, the non porous body having a textured surface with multiple indentations therein, wherein the thickest part of the electrolyte sheet is at least 0.5 micrometers greater than the thinnest part of the electrolyte sheet. It is preferable that the green sheet and the resulting electrolyte sheet has a thickness variation of at least 2 micrometers.

The texturing step may be achieved, for example, by molding or embossing when the green sheet is placed in a suitable mold or die (preferably with periodic depressions) to form desired surface indentations. Alternatively, sufficiently thin ceramic sheets can be also reformed through a process of superplastic deformation at high temperatures below their melting points. However, more effective and economic electrolyte sheet patterning can be achieved through the process of reshaping unfired green sheet at or near room temperature (20° C.) prior to sintering. However, the electrolyte sheet may also be patterned at a higher temperature, for example, 50° C., 100° C., 150° C. or 200° C.

Figure 6A:
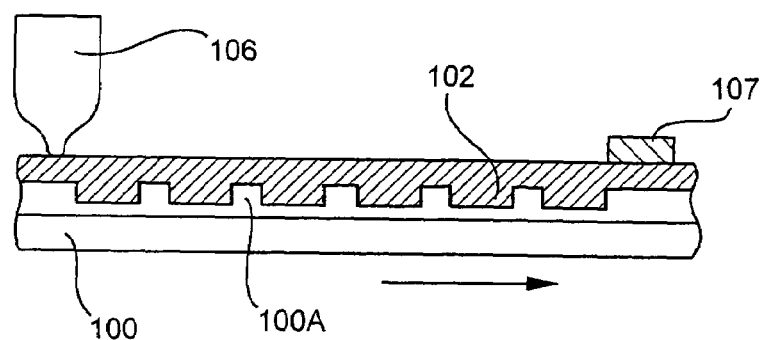
FIGS. 6A and 6B illustrate schematically two different ways of making a textured green sheet utilizing a textured or patterned surface.

There are several methods of producing the desired surface texturing in a flexible ceramic. One method involves tape casting or web coating over a patterned substrate carrier 100. The substrate carrier 100 can be patterned, for example, by two methods. One, is to have a moving substrate carrier (such as Mylar™ or a continuous belt of steel, or a Teflon™ coated fabric) embossed with the reverse pattern 100A of the desired indentations before tape casting or web coating the green pre-ceramic material 102 on it. This is illustrated schematically in FIG. 6A.

Figure 6B:
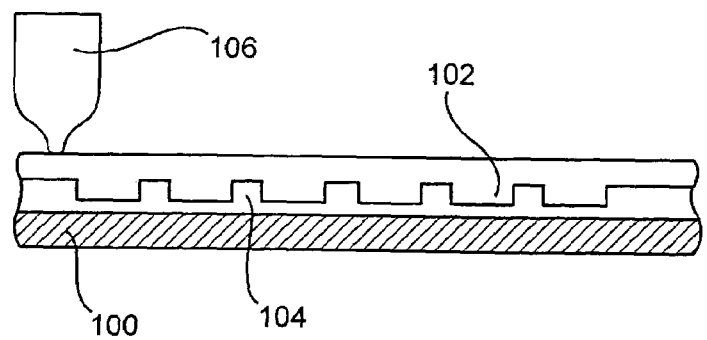

Another texturing method is to use a second layer 104 (for example, a polymer) on a flat substrate carrier. This is shown schematically in FIG. 6B. This polymer may be, for example, polymethyl methacrylate in a solution of ethyl acetate. When the solvent dries the polymer becomes a pliable solid material which is easy to pattern. The polymer layer 104 is then patterned, either by embossing (for example, by embossed roller or platen) or by stripping selected areas of the polymer from the substrate carrier 100 (leaving a pattern of the figurative polymer). The high spots in the pattern would correspond to the thin areas of the electrolyte sheet 10.

Figure 7:
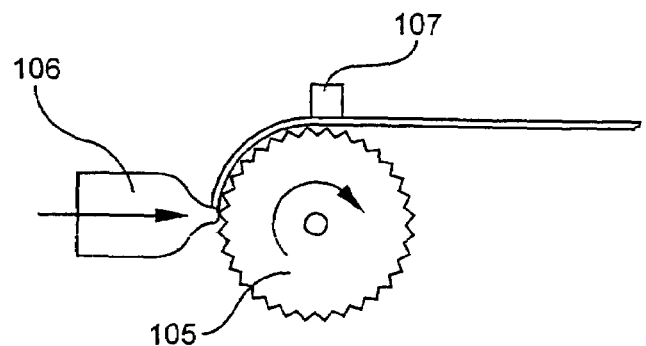
FIG. 7 illustrates schematically a method of making a textured green sheet utilizing a textured or patterned roller.

Another approach is to web coat or tape cast onto a uniform substrate carrier 100 that is drawn over a textured roller 105. This is shown schematically in FIG. 7. When web coating is utilized, the coating die 106 dispensing the green slurry will be typically far enough (greater than 25 micrometers and preferably greater than 50 micrometers) off the substrate carrier 100 that the green pre-ceramic coating may not fully reflect the underlying texture of the roller. A tape casting "doctor blade" 107 may be (optionally) placed 1 to 30 cm downstream from the web coating die 106, and with proper clearance (less than 50 micrometers and preferably 10 to 25 micrometers), it can remove green pre-ceramic material 102 from the higher areas of the green pre-ceramic sheet, thus producing the desired thinner areas in the green pre-ceramic sheet.

Figure 8A:
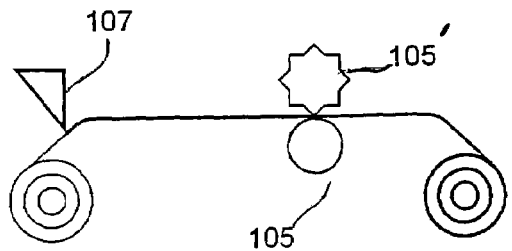
FIG. 8 illustrates schematically a method of making a textured green sheet utilizing a two rollers.

An alternative method is to run a cast, but unfired, green pre-ceramic sheet or tape through embossing rollers. At least one of these rollers 105, 105' is patterned. This is illustrated schematically in FIG. 8. The high areas of the rollers 105, 105' will squeeze the green pre-ceramic, thinning some areas. When working with green (i.e., unfired) pre-ceramic sheets of 15 to 30 micrometers thick, it is preferable to have the green pre-ceramic material run through the two rollers while on a substrate that is as thick or thicker then pre-ceramic sheet. The green pre-ceramic sheet may be also placed between two polymer carrier sheets during embossing.

The preferred electrolyte sheets 10 are formed of a polycrystaline ceramic selected from a group comprising of partially stabilized zirconia or stabilized zirconia, the partially stabilized, or stabilized zirconia, being doped with a dopant selected from the group comprising of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W and mixtures thereof. The crystalline geometries of zirconia such as tetragonal, monoclinic, and/or cubic and their combinations are all important physical parameters of this structural material. It is most preferable that partially stabilized zirconia is utilized because of its transformational toughening property. The tetragonal phase transforms into monolithic phase under stress and effectively prevents crack formation and propagation. Thus, the electrolyte sheet is more durable, mechanically strong and easier to handle. The more preferable stabilizing dopants are Y, Yb, Ca, Mg, or Sc. Of these dopants Sc, Yb and Y have excellent ionic conductivity. Ceramic sheets can be made tougher by selecting certain toughening agents known to those skilled in this art. Particularly useful and preferred toughening agents are the oxides of tantalum and niobium which can be advantageously added to the above stabilizers.

The preparation of a green 3 YSZ based sheet involves some form of casting an appropriate ceramic slip. One such slip is described in the following example.

Example 1-Preparation of a Ceramic Slip.

A ceramic slip is made containing 100 grams of zirconia powder using the components shown in Table 1, below.

TABLE 1

Components of Slip Batch

| Component | Manufacturer | Form | Function | Batch mass |
|---|---|---|---|---|
| Zirconia TZ-3Y | Tosoh | powder | ceramic | 100.0 g |
| Ethanol | Mallinkrodt | liquid | solvent | 36.36 g |
| 1-Butanol | Fisher | liquid | solvent | 8.79 g |
| Propylene Glycol | Fisher | liquid | solvent | 2.00 g |
| Water (distilled) | | liquid | solvent | 2.50 g |
| Emphos PS-21A | Witco | liquid | dispersant | 1.00 g |

All ingredient bottles are kept tightly closed until used to reduce water pickup. A 250 ml Nalgene® polyethylene plastic container is cleaned by rinsing twice with about 10-20 ml of ethanol or methanol. The container is then placed in a 70° C. drying oven to evaporate the alcohol. After drying, the container and lid are weighed. The zirconia powder is weighed out in a weighing boat and set aside. The ethanol is pipetted into the dried Nalgene container. The 1-butanol is then pipetted into the plastic container. Subsequently, propylene glycol is pipetted into the container. Finally, the water and, then, the Emphos PS-21A are pipetted into the container. About 450 grams of 10 mm Tosoh TZP-3Y milling media is weighed out and the weight recorded. The media is then added to the container and the container is gently shaken. The zirconia powder is then added from the weighing boat. The lid is replaced onto the container and tightened. The closed container is re-weighed and the total weight of solvents, powder, and dispersant is calculated. The slip is then subjected to vibratory milling for 72 hours, after which the viscosity of the slip is measured.

Two settling steps are performed in order to remove the coarse grains and narrow the grain size distribution in the slip. A double settling technique provided a good grain size distribution with acceptable material losses.

A second 125 ml Nalgene® plastic container and lid are washed and dried as above. The second container and lid is weighed and the weight recorded. The slip from the milling container is poured into the second container, leaving the milling media in the original container. The slip and second container with lid is then weighed. The coarse grains are allowed to settle out of the slip for 72 hours. A third container and lid are washed, dried, weighed, and the weight recorded. Carefully, the unsettled slip is pipetted into the third container, being careful not to pick up any of the settled sediment. The pipetted slip with the third container with lid are weighed. This slip is then allowed to settle for an additional 24 hours. The residue/sediment in the second container is dried in a ventilated oven at about 90° C. for at least three hours and the dried residue and container plus lid are weighed.

A fourth 125 ml plastic container and lid are washed and dried as above. The weight of this fourth lid and container is then recorded. Again, the slip from the third (24 hour settling) container is pipetted into the fourth container, being careful not to pick up any of the settled residue with the pipette. The fourth container and slip are 0weighed and the weight recorded. The reside is dried in the third container, as above, and then weighed. From the recorded weights, it can be determined how much ceramic powder is left in the fourth container.

A weak flocculating agent, glacial acetic acid, a plasticizer, and a binder are added to the ceramic powder present in the remaining slip. The components used for flocculation and binding, reported in weight percent in excess of the weight of the remaining ceramic powder, are shown in Table 2, as follows:

TABLE 2

Components Used For Flocculation and For Binder System

| Component | Manufacturer | Form | Function | Batch mass |
|---|---|---|---|---|
| Glacial Acetic Acid | Malinckrodt | liquid | flocculant | 1 wt % of remaining ceramic powder |
| Isopropyl alcohol | Fisher | liquid | acid dilution | 1 wt % |
| Dibutyl-Pthalate | Aldrich | liquid | plasticizer | 3.5 wt % |
| Polyvinyl Butyral | Monsanto | powder | binder | 6 wt % |

A 50/50 wt % solution of glacial acetic acid in isopropyl alcohol is made. 2 wt % (in excess of the weight of the remaining ceramic powder) of this solution is pipetted into the slip in the fourth container. The lid is replaced and the container is gently shaken.

Next, 3.5 wt % (in excess of the weight of the remaining ceramic powder) of dibutyl-pthalate is pipetted into the slip in the fourth container. The lid is replaced and the container is gently shaken. Using a weighing boat, 6 wt % (of the remaining ceramic powder) of polyvinyl butyral is weighed out and poured into the slip. The lid is replaced and the container is gently shaken. This container is then placed on a paint shaker type of device for at least 15 minutes to fully dissolve the binder. Two clean zirconia milling media are put into the container and the container is placed on a roller mill at low speed for three days.

The use of a polymer (polymethyl methacrylate) base layer in the tape casting procedures is advantageous because it makes the thin green material easier to handle. To provide such a layer, a fugitive polymer solution was prepared in a polyethylene bottle by dissolving 40 parts by weight polymethyl methacrylate in 60 parts of ethyl acetate. The solution was placed on a roller mill to mix. The acrylic polymer solution thus provided was then cast onto a substrate carrier using a doctor blade to form thin acrylic sheet. The polymer-coated substrate carrier was then placed in a 60° to 70° C. drying oven for 30 to 60 minutes.

It is noted that at sufficient temperatures (e.g., about 600° C. and above), zirconia based thin electrolyte sheets exhibit good ionic conductance (smaller than 0.005 ohm/cm$^2$) and very low electronic conductance (less than 0.5 ohm/cm$^2$ and preferably 0.2 ohm/cm $^2$) It is noted that electrolyte ionic conductivity increases with higher operating temperatures, but the choice of stable materials used (for example, metals useful for manifolding) becomes increasingly limited since inexpensive metal alloys will oxidize above about 850° C. Therefore, it is preferable that fuel cells which include electrolyte sheets of the present invention operate between 600° C. and 850° C.

EXAMPLES

The invention will be further clarified by the following examples.

Example 1

Figure 9A:
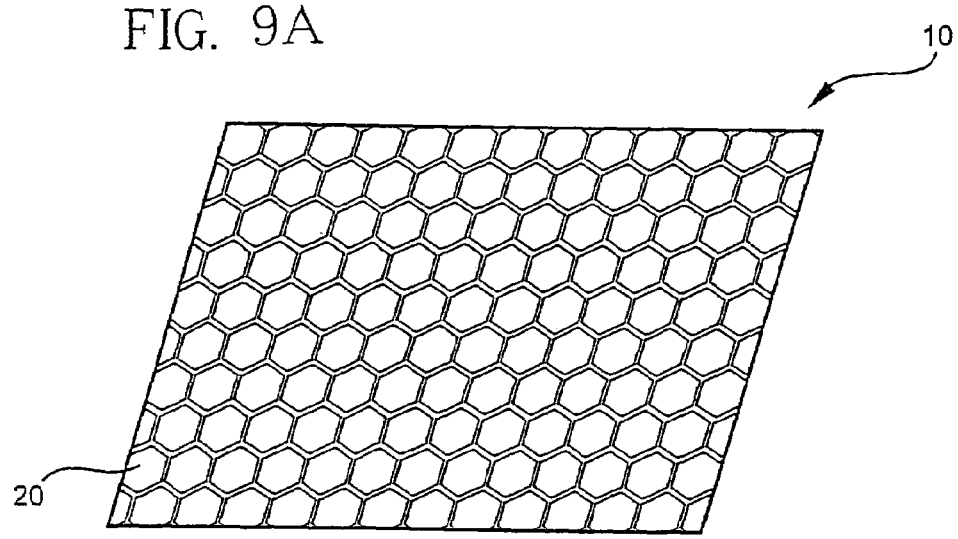
FIG. 9A illustrates one example of the electrolyte sheet of the present invention.
Figure 9B:
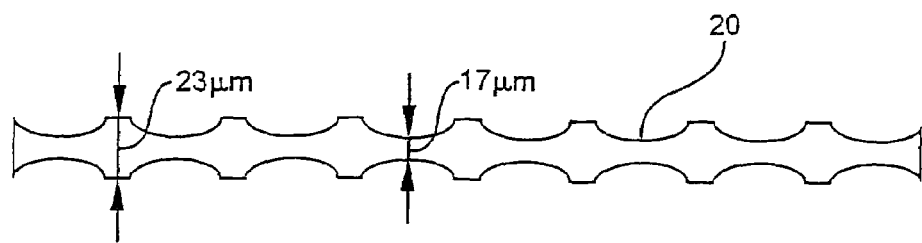
FIG. 9B illustrates the cross-sectional view of the electrolyte sheet of FIG. 9A.

FIG. 9A illustrates one example of the electrolyte sheet of the present invention. FIG. 9B illustrates the cross-sectional view of the electrolyte sheet of FIG. 9A. The electrolyte sheet 10 of this example has two textured surfaces 20, 22. This electrolyte sheet was made as follows:
i. In a filtered air "clean" environment, Teflon® coated cloth (150 micron-Ultra Premium Grade PTFE coated fiberglass fabric, available from CS Hyde Co., Lake Villa Ill., USA) is smoothed out on a glass plate and then attached to the glass plate with tape. The Teflon® coated cloth has an existing micro texture (weave).
ii. A slip of zirconia—3 mole % yttria powder is coated on the Teflon coated cloth using a tape casting "doctor" blade with a 50 micron gap and a 15 cm width, forming a green pre-ceramic sheet.
iii. The micro-textured green pre-ceramic sheet was dried for ½ hour at room temperature under a plastic cover that encased the drying green pre-ceramic sheet, with about a 2 mm gap along the width of the ceramic sheet but no gap along the long edges.
iv. The micro-textuted green pre-ceramic sheet was then dried in an oven at 60° C. for 1 hour.
v. Finally, the micro-textured green ceramic sheet was sintered at 1430° C. for 2 hours.

After sintering the micro-texturing (periodic variations in thickness) of the electrolyte sheet 10 was observed via SEM (Scanning Electron Microscope). The SEM observation showed that the maximum thickness of the micro textured sheet was about 23 micrometers and the thickness of the thin areas was about 17 micrometers. The sintered electrolyte sheet 10 has a very textured side 20 and a somewhat less textured side 22, corresponding to the bottom of the casting and the top surface of the casting respectively. The invention will be further clarified by the following examples.

An anode ink was screen printed on the textured side of the sintered electrolyte sheet of this example, and a cathode was printed on the opposing side. During drying at 150° C. for 30 minutes the ink remain well adhered to either side of the micro-textured electrolyte sheet and its adherence is better than its adherence to non-textured electrolyte sheet of the same thickness.

Figure 10:
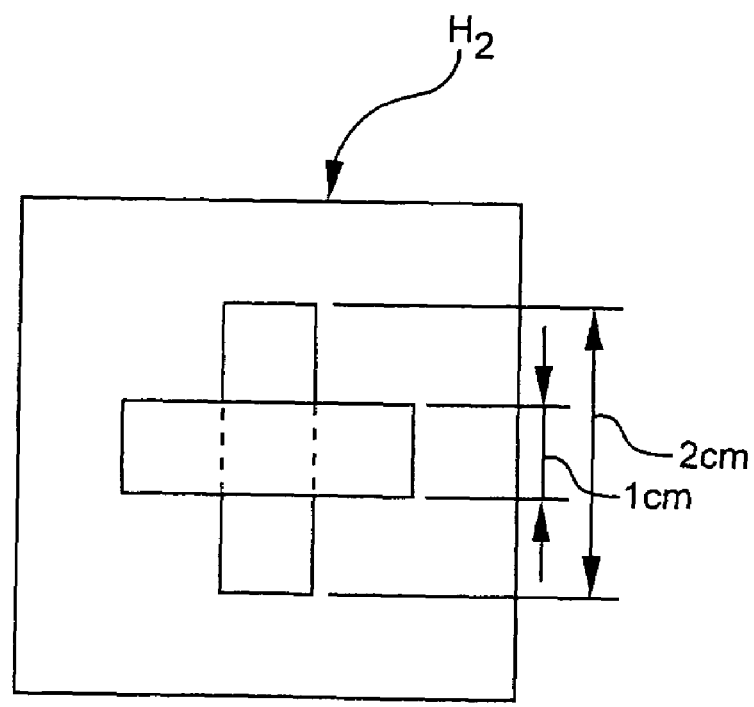
FIG. 10 illustrates schematically a crossed single cell that utilizes an electrolyte sheet of FIGS. 9A and 9B.

FIG. 10 schematically illustrates a crossed single cell. The electrodes were screen printed on a micro-textured zirconia—3 mole % yttria electrolyte sheet 10 illustrated in FIGS. 9A and 9B. More specifically, the crossed cell includes two crossed electrodes, each electrode being 2 cm long by 1 cm wide, resulting in effective cross sectional area of 1 cm$_2$. The electrodes were printed and fired on the micro-textured 3 YSZ electrolyte sheet in successive operations. First an anode layer comprising a mixture of 3 YSZ and nickel oxide was printed and fired at 1350° C. for 1 hour. Next a cathode comprising a mixture of 3 YSZ and lanthanum strontium manganate (LSM) was printed and fired at 1200° C. for 1 hour. Next, a silver 10% palladium alloy mixed with dysprosium bismuthate cathode current collector was printed on the cathode side and a silver 10% palladium alloy mixed with 3 YSZ anode current collector was printed on the anode side. The current collectors were co fired at 850° C. for 1 hour. The resultant single crossed cell was tested in a simple "packet" configuration illustrated in FIG. 10. Forming gas (6% H$_2$—balance N$_2$) was provided to the interior chamber through a gas feed tube; air is supplied to the packet exterior. When tested at 725° C. this cell provided power density of 0.39 W/cm$^2$. In comparison, a similar cell was fabricated with identical electrodes, with a similar electrolyte sheet cast as above, but on a flat Teflon surface. The resultant flat, untextured electrolyte sheet was uniformly 20 micrometers thick. The cell with the flat, untextured electrolyte sheet reached a maximum 0.32 W/cm$^2$ under similar test conditions. Therefore, electrolyte surface texturing improved electrolyte cell performance by nearly 25%.

Example 2

Applicants also discovered that it is desirable to modulate the electrolyte thickness in a patterned fashion in order to improve its net mechanical properties. First consider the case of an electrolyte of uniform thickness. If the space between electrode strips (i.e., via galleries 55) has less printed material (to accommodate vias and/or via pads) the via gallery will be comparatively less "stiff" then the electrode regions. On flexure of the device, the via gallery regions will be subject to stress concentration because they are relatively more flexible than the electrode regions and will have a relatively short radius of curvature. In this case, because we wish to avoid concentrating stress in the regions between the electrodes which contain the vias (i.e., through holes), a more uniform flexure is desired throughout the electrolyte sheet. Therefore, it will be advantageous to provide more thickness in the via gallery regions, which will provide more uniform flexure of the electrolyte sheet.

Figure 11A:
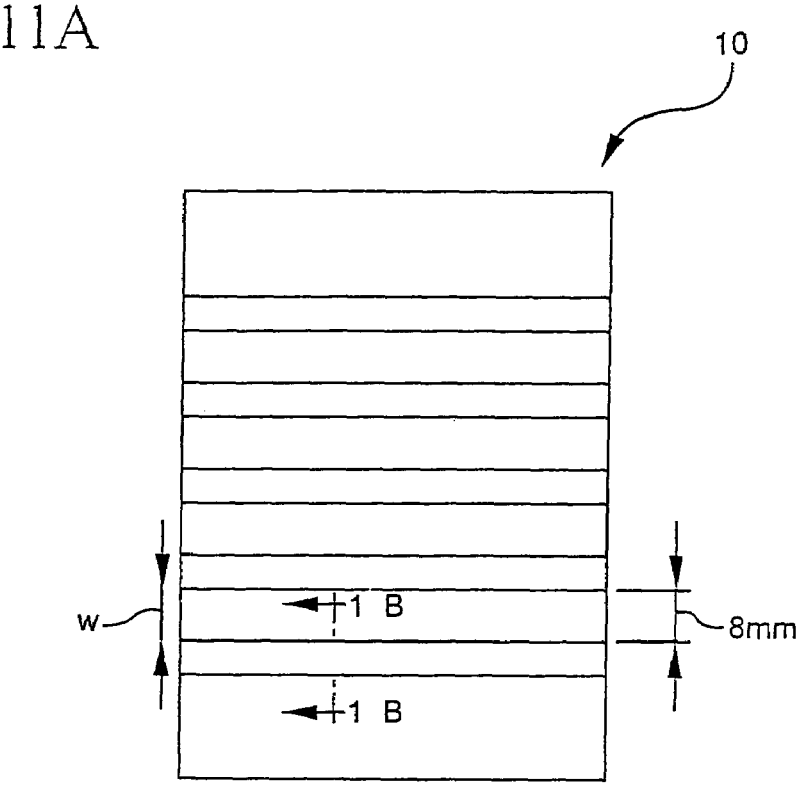
FIG. 11A illustrates an exemplary electrolyte sheet with thickness variations for control of mechanical flexure.
Figure 11B:
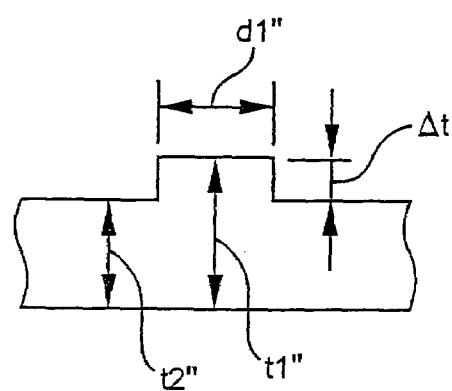
FIG. 11B illustrates a cross-section of the portion of the electrolyte sheet of FIG. 11A.

FIG. 11A illustrates an electrolyte sheet with thickness variations for control of mechanical flexure. FIG. 11B illustrates a cross-section of the portion of this electrolyte sheet. Thicker regions $t_1$ of the electrolyte sheet will become the via galleries of the finished device and are separated by a distance of 10 mm. The thin regions $t_2$ will be printed with the electrode layers. To achieve the desired device flexural properties, it is preferable that the thickness of the electrolyte sheet corresponding to via galleries be 15 micrometers to 60 micrometers and, preferably, 15 to 45 micrometers thick and even more preferably 18 to 25 micrometers thick. For example, the thicker regions may be 60 micrometers thick while the thinner regions may be 20 micrometers thick, which results in Δt of 40 micrometers.

Example 3

Figure 12:
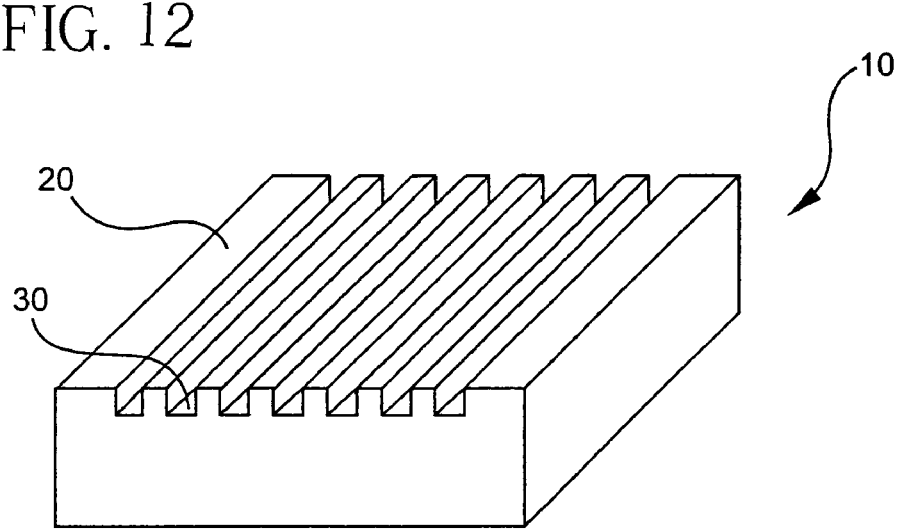
FIG. 12 illustrates schematically another example of electrolyte sheet with thickness variations.

FIG. 12 illustrates another example of the electrolyte sheet 10 with a textured surface 20. Surface 20 includes a plurality of linear indentations or grooves. These features are 3 micrometers wide and 3 micrometers deep and separated by 3 micrometers. The non-grooved portions of the electrolyte sheet 10 are 15 micrometers thick. The grooves reduce the average electrolyte thickness by 1.5 micrometers (10%) and increase the surface area by a factor of 2 (100%) in the textured region.

A similar plurality of grooves with 1 micron separations, vertical walls, 1 micrometer wide and 6 micrometers deep will have an aspect ratio of 6:1 and thus reduce the average electrolyte sheet thickness by 3.5 micrometers (20%) while increasing the surface area by a factor of seven.

As another variation of this example, an array of grooves 3 micrometers wide and 5 micrometers deep with wall angles of 70 degrees reduces the thickness of the electrolyte sheet by 2.5 micrometer (about 17% of a 15 micrometer nominal thickness) and increases the surface area by a factor of 2.34.

Figure 13:
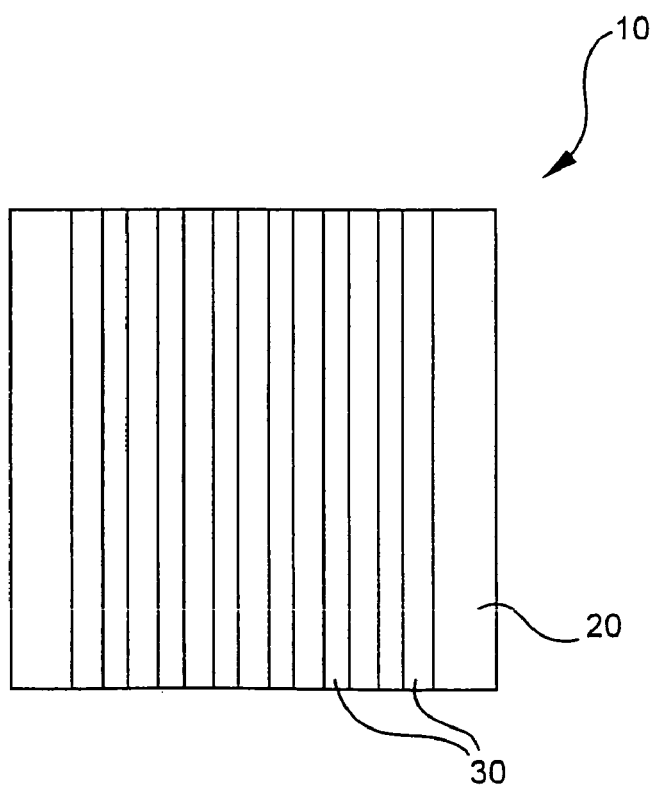
FIG. 13 illustrates a top view of yet another exemplary electrolyte sheet, as seen under a microscope.

FIG. 13 shows a top view of similarly patterned electrolyte sheet as seen under a microscope. The pattern includes 3 micrometer wide channels with depths of 3 micrometers, separations of 3 micrometers, and 70 degree wall angles. These features reduce the thickness of the electrolyte sheet by 1.5 micrometer (about 10% of a 15 micrometer nominal thickness) and increase the surface area by a factor of 1.70.

It is preferable the surface area features increase the electrolyte surface area by a factor of 1.1 to more than 20. The preferable aspect ratio of these surface features falls in the range of 0.1:1 to 10:1.

Example 4

Figure 14A:
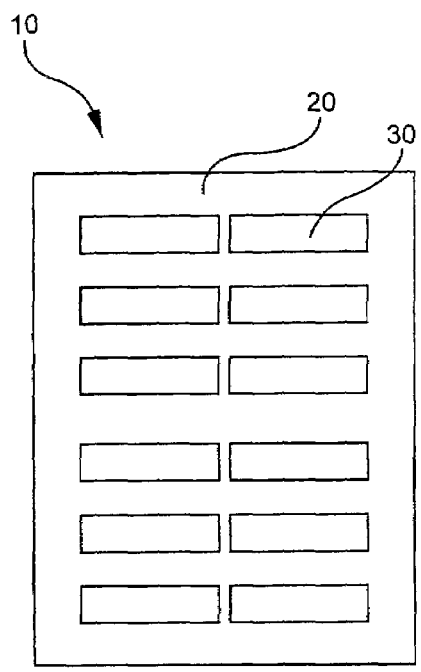
FIGS. 14A and 14B illustrate schematically two more examples of a textured electrolyte sheet with a textured surface.
Figure 14B:
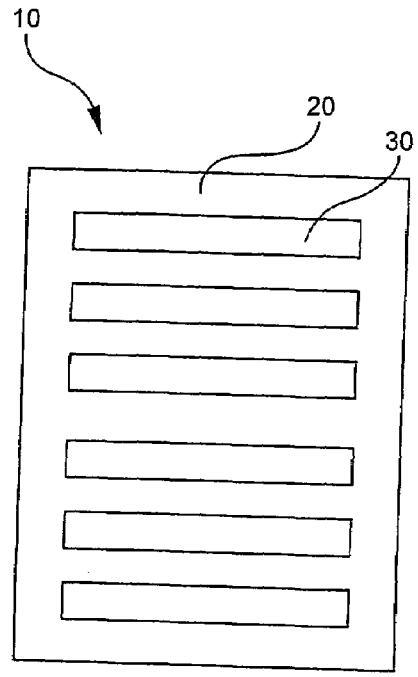
Figure 14C:
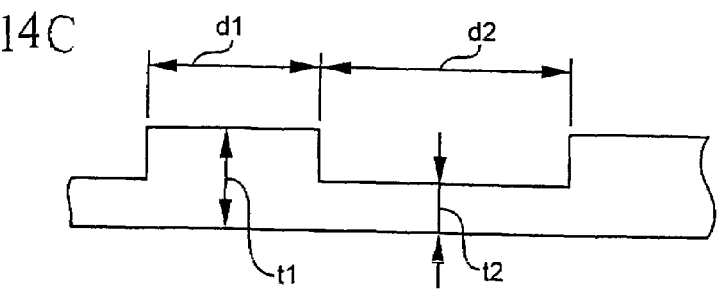
FIG. 14C illustrates a cross-section of a region of the textured electrolyte sheets illustrated in FIGS. 14A and 14B.

A 75 micron thick Mylar substrate carrier was coated with a thin, less than 1 micrometer layer of methyl cellulose as a release agent and dried at 65° C. for more than ½ hour. An acrylic layer was then cast with a 12.5 micron or 25 micrometer clearance doctor blade over the methyl cellulose layer and dried at 65° C. for more than ½ hour. Using a sharp blade (such as exacto knife or a laser blade), a pattern similar to that depicted in FIG. 14A was made in the acrylic layer. The areas on the pattern that corresponds to the thick areas in the final electrolyte sheet were the areas on the Mylar(g substrate where the acrylic layer were carefully pealed off. A second layer of methocel was applied to the patterned acrylic and the substrate carrier and was also dried. Using a 12.5-micrometer or a 25-micrometer gap tape casting doctor blade, a ceramic slip was cast over the patterned acrylic on the substrate carrier to form a green pre-ceramic sheet. After the green pre-ceramic layer had dried, a second acrylic layer (overcoat) was cast over the green pre-ceramic sheet. After the overcoat dried, the green pre-ceramic sheet with the acrylic overcoat was removed from the Mylar(g substrate carrier. (The second acrylic layer is applied to provide backing to the green sheet in order to enable it to be separated (pulled off) from the methocel layer.) The green pre-ceramic sheet with thin and thick portions was sintered in air at 1430 ° C. for 2 hours resulting in a dense, flexible ceramic sheet 10 with thick and thin areas. The surface profile of this ceramic sheet was measured via SEM and surface profilimoter and we observed that the thin areas were several to ten micrometers thinner than the thicker areas. An electrolyte sheet pattern similar to that of FIG. 14B may also be utilized.

Example 5

In a filtered air "clean" environment, tape was placed on a flat glass substrate. A 25 micrometer thick Teflon® substrate carrier was placed upon the glass substrate and smoothed to avoid wrinkles. Using a 50 micron gap tape casting "doctor" blade, a 40 inch x 6 inch sheet of ceramic/polymer (zirconia,—3 mole % yttria powder) was cast upon the Teflon substrate carrier. The ceramic layer was dried for ½ hour at room temperature under a plastic cover with about a 2-mm gap along the 6-inch edges of the ceramic sheet but no gap along the long edges. Second, it was dried in an oven at 60 degrees C. for 1 hr. The acrylic layer of the above described composition was cast on top of the ceramic after drying using a 7 inch width, 25 micrometer gap blade. After the acrylic was dried at room temperature for ½ hour then 60° C. for 1 hour, the green ceramic with acrylic overcoat were removed from the Teflon carrier. The green ceramic sheet with thin and thicker areas was sintered at 1430° C. for 2 hours. After sintering the thin and thick layers were easily observed by the amount of transparency in the sintered sheet. SEM observation gave the thickness of the thick areas as 26 microns and the thickness of the thin areas as 15 microns.

Example 7

An electrolyte sheet, when utilized in a fuel cell, will typically be operated with much higher flow of air, compared to fuel flow. This is done to supply sufficient oxygen from the air to the fuel cell assembly. The airflow would create a greater stress in middle region of the electrolyte sheet.

Figure 15:
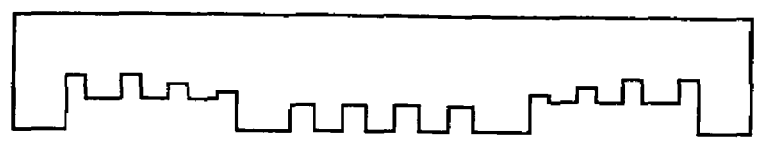
FIG. 15 illustrates schematically a cross-section a textured electrolyte sheet that has relatively thick central region.

An embodiment of the textured electrolyte sheet that is especially suited to operate in such environment is illustrated schematically on FIG. 15. As other electrolyte sheets examples disclosed above, this electrolyte sheet includes thicker and thinner areas. However, in the electrolyte sheet of this embodiment, the thinner areas become progressively thinner closer to the edges. That is, because some regions of the electrolyte sheet (such as the center, for example) experience higher stresses when pressurized, it is advantageous that these regions of the electrolyte sheet have larger average thickness than the regions experiencing less stress.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A solid oxide electrode/electrolyte assembly comprising:
    a thin electrolyte sheet made of partially stabilized zirconia and having varied thickness and an average electrolyte sheet thickness between 3 micrometers and 30 micrometers;
    a plurality of cathode and anode pairs comprising: (a) a plurality of cathodes disposed on a first surface of said electrolyte sheet; (b) a plurality of anodes disposed opposite the cathodes on a second surface of said electrolyte sheet;

a plurality of interconnects situated in via galleries, said via galleries being located between said plurality of electrodes;

wherein said electrolyte sheet is bendable to an effective radius of curvature of less than 20 cm, has a surface with a pre-determined re-producible pattern and a thickness variation of at least 2 micrometers and its thickness variation is 6.6% to 90% of the average electrolyte sheet thickness, and wherein at least 50% of the area of the electrolyte sheet situated between said cathode and anode pairs has a thinner body than the rest of the electrolyte sheet situated under said cathode and anode pairs and wherein the average thickness of the electrolyte sheet situated between said cathode and anode pairs is smaller than the average thickness of the electrolyte sheet in via galleries.

2. An electrode/electrolyte assembly according to claim 1, wherein the electrolyte sheet is a ceramic sheet formed of a polycrystalline ceramic selected from a group consisting of partially stabilized zirconia or stabilized zirconia, and being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W and mixtures thereof.

3. An electrode/electrolyte assembly according to claim 2, wherein said average electrolyte sheet thickness is between 4 and 20 micrometers and the thickness variation is at least 10% of the average electrolyte sheet thickness.

4. An electrode/electrolyte assembly according to claim 3, wherein said average electrolyte sheet thickness is between 4 and 15 micrometers.

5. An electrode/electrolyte assembly according to claim 4, wherein said average electrolyte sheet thickness is between 8 and 15 micrometers.

6. An electrode/electrolyte assembly according to claim 3, wherein said thickness variation 2 to 10 micrometers.

7. A solid oxide electrode/electrolyte assembly comprising:

a thin solid oxide electrolyte sheet made of partially stabilized zirconia and bendable to an effective radius of curvature of less than 20 cm, said electrolyte sheet being of varied thickness of an average electrolyte sheet thickness between 3 micrometers and 30 micrometers and thickness variation of at least 0.5 micrometers and ohmic resistance of no more than 0.5 ohm-cm2;

(a) a plurality of cathodes disposed on a first surface of said electrolyte sheet; and (b) a plurality of anodes disposed opposite said plurality of cathodes on a second surface of said electrolyte sheet, forming a plurality of cathode and anode pairs;

wherein there are multiple thinner electrolyte sheet areas situated between said plurality of cathode and anode pairs, wherein at least 75% of the area of the electrolyte sheet situated between said plurality of cathode and anode pairs has a thinner body than the rest of the electrolyte sheet situated between said plurality of cathode and anode pairs and, wherein the average thickness of the electrolyte sheet situated between said plurality of cathode and anode pairs is smaller than the average thickness of the electrolyte sheet not situated under between said plurality of cathode and anode pairs, wherein said solid oxide electrode/electrolyte assembly does not include interconnect plates.

8. The solid oxide electrode/electrolyte assembly according to claim 7 wherein said electrolyte sheet has a textured surface with multiple indentations.

9. The solid oxide electrode/electrolyte assembly according to claim 1 wherein said electrolyte sheet has a textured surface with multiple indentations.

10. The fuel cell device according to claim 1, wherein thinner areas of said electrolyte sheet are micro-textured.

* * * * *